Patented Dec. 16, 1952

2,622,071

UNITED STATES PATENT OFFICE 2,622,071

ESTERIFICATION PROCESS

Stuart A. Harrison, Minneapolis, Minn., assignor to General Mills, Inc., a corporation of Delaware No Drawing. Application April 9, 1951,
Serial No. 220,140

16 Claims. (Cl. 260—19)

The present invention relates to a process for the esterification of compounds having phenolic hydroxyl groups.

Generally the preparation of esters of compounds having phenolic hydroxyl groups has been difficult and expensive. It was generally considered necessary to resort to the use of acid chlorides or anhydrides in order to effect this esterification. The acid chlorides and anhydrides of many organic acids such as the higher fatty acids, are not readily available. Moreover, they are difficult to transport and difficult to store.

More recently various attempts have been made to esterify phenolic compounds directly by means of organic acids in the presence of the usual esterification catalyst. While these direct esterification processes have represented improvements over the older processes involving the use of the acid chlorides or anhydrides, they have left much to be desired. Thus when phenolic hydroxyl groups are esterified in the presence of conventional esterification catalysts, the esterification rates are comparatively low and accordingly the time period required becomes extended. This extended time period not only reduces the capacity of a given piece of esterification equipment, but also produces other difficulties. For example, when the esterification of phenolic resins with unsaturated higher fatty acids is attempted, the extended time period for esterification effects some bodying of the fatty acid, and accordingly there is a tendency for the reaction mixture to gel before esterification is completed to the desired degree. In addition, the conventional esterification catalysts result in esters having poor color.

It has now been discovered that compounds having phenolic hydroxyl groups can be esterified with organic acids employing esters of phosphorous acid as an esterification catalyst. These phosphorous acid esters greatly accelerate the esterification, thereby reducing the tendency for gelation to occur when unsaturated fatty acids are employed. In addition, the esters produced are of a desirable light color.

It is therefore an object of the present invention to provide a novel process of esterifying compounds having phenolic hydroxyl groups by means of phosphorous acid esters as the catalyst.

The invention is applicable to the esterification of phenols in general. These may be simple phenols, halogenated phenols such as the chlorophenols, cresols, other substituted phenols such as p-tert-butyl phenol, p-phenyl phenol, and the like, naphthols, bis- and tris-phenols. The invention is particularly adapted to the esterification of higher molecular weight materials such as the phenol-aldehyde resins, particularly phenol-formaldehyde resins.

The invention is applicable to a wide variety of organic acids, and is particularly useful for the esterification of acids whose anhydrides and acid chlorides are either difficult or expensive to prepare. The invention is especially desirable for the esterification of compounds having phenolic hydroxyl groups with high molecular weight acids such as the fatty acids, rosin acids, and polycarboxylic acids. The fatty acids found to be particularly useful in the present invention include all of the fatty acids having from 8 to 22 or more carbon atoms. These include the saturated as well as the unsaturated acids, and include any individual isolated acid, the mixed acids of a fat or oil or any selected fraction thereof. Furthermore, fatty acids produced by the oxidation of petroleum hydrocarbons, may be used. Since the present catalysts effect the esterification in a short period of time, it will be apparent that the invention is especially adapted to the esterification of fatty acids having drying or semi-drying properties, such as linseed and soybean oil acids, inasmuch as these acids tend to body when subjected to elevated temperatures for extended periods of time.

The catalysts employed in the present process are either aliphatic or aromatic esters of phosphorous acid. The phosphorous acid may be completely or only partially esterified. Typical of the phosphorous acid esters are triphenyl phosphite, tri-para-cresyl phosphite, tri-(2-ethylhexyl) phosphite, and di-(2-ethylhexyl)-phosphite.

The esterification is effected by introducing the phenolic material, the esterifying acid, and the catalyst into a reaction vessel, preferably together with an azeotrope such as xylene or toluene. Preferably at least about 1% of the catalyst based on the weight of the phenolic compound should be employed in order to obtain appreciable esterification rates. In general, about 2% of the catalyst gives a desirable commercial rate of esterification. Higher concentrations of catalyst may be employed and these higher concentrations do result in increased rates of reaction. In general, however, catalyst concentrations above 5% are not necessary.

The reactants may be heated up in the reaction vessel, which may be either open or closed depending upon the nature of the materials undergoing esterification.

Appreciable rates of reaction are obtained at temperatures as low as 150° C. In general, however, it is preferred to operate at temperatures of 200° C. and above, but below the decomposition temperature of the materials being reacted. In general, this reaction temperature varies within the range of 200–300° C. The particular reaction temperature preferred in a given instance depends on the relative reactivity of the materials employed, the possibility of other reactions such as condensation, polymerization, and the like. For example, when it is desired to esterify phenol-formaldehyde resins with unsaturated higher fatty acids, it is preferred to operate within the range of 220° C. to 260° C. with a preferred temperature of about 235° C. Where the phenol-formaldehyde resin is derived from substituted phenols such as p-tert-butyl phenol or p-phenyl phenol, higher esterification temperatures may be employed up to 270° C. without danger of gelation. Where saturated higher fatty acids are employed more elevated temperatures within the above range may be employed without danger of gelation.

The process may be carried on to effect any desired degree of esterification. For example, with polyphenolic materials it may be desired to effect only partial esterification. For this purpose it is possible to employ the quantity of acid stoichiometrically equivalent to the desired degree of esterification and to substantially completely esterify this quantity of acid with the phenolic material. As an alternative, an excess of the acid or phenol may be employed over and above that required for the desired degree of esterification, and the excess may be allowed to remain in the reaction mixture or may be removed, depending upon the particular product desired.

The following examples will serve to illustrate the invention:

Example 1

A phenol-formaldehyde resin was prepared by slowly adding 1001 g. of formalin (37%) to 1807 g. of phenol (maintained at approximately 100° C.) containing 4.8 g. of oxalic acid which served as the catalyst. The mixture was refluxed for 7 hours after all the formalin had been added. The excess water, oxalic acid, bisphenols, and excess phenol were stripped off by heating first under water pump vacuum to 250° C. and finishing up at .4 mm. and 310° C. The resin remaining after stripping weighed 1266 g. A portion of the resin (100 g.) was esterified with 267 g. mixed soybean oil fatty acids (acid No. 200) by mixing in a 3-neck 1-liter flask equipped with a Stark and Dean tube, with condenser, mechanical stirrer and thermometer. Triphenyl phosphite (2 g.) and xylene (50 cc.) were added. The esterification was carried out at 233–236° C. and at the end of 8¼ hours it was 96% complete. The final ester is stripped of solvent, any excess fatty acids, and triphenyl phosphite by heating to 250–270° C. at .1–.3 mm. The product is a clear, viscous, light amber oil.

The above experiment was duplicated with varying concentrations of triphenyl phosphite as the catalyst, with zinc stearate as the catalyst and with no catalyst. The esterification rate at 235° C. for these variations are shown in the following table. The quantity of catalyst is based on the weight of the phenol-formaldehyde resin.

| Time in hours | Triphenyl phosphite | | | Zinc stearate, 3% | No catalyst |
|---|---|---|---|---|---|
| | 1% | 2% | 4% | | |
| 1 | ¹35 | ¹53 | ¹63 | ¹22 | ¹17 |
| 2 | 56 | 71 | 77 | | 33 |
| 3 | | 81 | 85 | 47 | 43 |
| 4 | | 86 | 90 | | 50 |
| 5 | 82 | 89 | 92 | 62 | 57 |
| 6 | | | 94 | 68 | 61 |
| 7 | 88 | 93 | 97 | | ¹6 |
| 8 | | 96 | | | 68 |
| 12 | 93 | | | | |
| 22 | | | | ⟨9 | |
| 24 | | | | | 83 |

¹ Percent of complete esterification.

Example 2

A phenol formaldehyde resin was prepared by heating 450 g. of phenol and 1.62 g. of oxalic acid to 100° C. in a 1-liter 3-neck flask equipped with stirrer, thermometer and dropping funnel. To the hot solution 219 g. of formalin was added slowly through the dropping funnel over a period of one hour. The mixture was refluxed for seven hours. The excess phenol, water, oxalic acid and bisphenols were stripped from the resin by first heating to 250° C. under water pump vacuum and finishing by heating to 310° C. at 0.2 mm. The stripped resin weighed 270 g. One hundred grams of the above resin, 200 g. of mixed soybean oil fatty acids, 72.2 g. of wood resin, 2 g. of triphenyl phosphite, and 50 cc. of xylene were placed in a 1-liter 3-neck flask equipped with mechanical stirrer, Stark and Dean tube, condenser and thermometer. The stirred mixture was heated to 232–235° C. and held there for 5½ hours. The water of esterification was removed azeotropically. At the end of 5½ hours the esterification was 92% complete. The temperature was then raised to 270–275° C. for 45 minutes to give a final esterification of 95%. The excess fatty acids, triphenyl phosphite and xylene were removed by heating to 275° C. at .1 mm. The resulting ester had an acid number of 3 and a hydroxyl number of 27. The color and clarity of the ester were good. A 60% solution of the ester in mineral spirits was made and 0.1% cobalt as the naphthenate added. Films cast from this solution dried rapidly and were relatively hard.

Example 3

Tri-(2-ethylhexyl) phosphite was prepared by a method similar to that described by McCombie, Saunders, and Stacey (J. C. S. 380 (1945)). Phosphorus trichloride (68.7 g.) was dissolved in 30 cc. of carbon tetrachloride and added slowly to a stirred solution of 2-ethyl hexanol (196 g.) in dimethyl aniline (182 g.). The addition required about one hour. Considerable crystallization took place during this time. After standing overnight the mixture was filtered and the crystals washed with carbon tetrachloride. The combined filtrate and washings were dried over sodium sulfate. The dried solution was distilled first under water pump vacuum to remove carbon tetrachloride and other low boiling materials. The remainder was distilled under oil pump vacuum. After a forerun of 46 g., a fraction (98 g.) was taken boiling from 170–178° C. at .27 mm. (some superheating). This fraction was redistilled through a 6″ Vigreaux column and a fraction taken boiling from 155–160° C. at .6 mm. (58 g.). This material had a refractive index $n_D^{30}=1.4458$, acid number 1.6 and hydroxyl number 2.3.

The phenol-formaldehyde resin was prepared according to the method described in Example 1, from 1804 g. of phenol, 1000 g. of formalin, and 4.8 g. of oxalic acid. After the 7 hours of refluxing, the excess water, phenol, oxalic acid and bisphenols were stripped off by heating first under water pump vacuum at 240° C., and finally by heating to 310° C. at 0.3 mm. 1266 grams of resin having a capillary melting point of 93–100° C. were obtained.

One hundred grams of the above phenol-formaldehyde resin, 267 g. of mixed soybean oil fatty acids, 2 g. of the above prepared tri-(2-ethylhexyl) phosphite, and 50 cc. of xylene were reacted according to the esterification technique described in Example 1. The esterification was conducted at a temperature of 235–237° C. The extent of esterification at various time intervals is indicated in the following table:

| Esterification time (hr.) | 1 | 2 | 3 | 4 | 5 | 7 | 8.5 | 11.5 |
|---|---|---|---|---|---|---|---|---|
| Percent esterification | 46.5 | 63 | 74 | 79 | 82 | 87 | 90 | 95 |

A sample of the reaction product was then stripped of xylene at a temperature of 270° C. and a pressure of .2 mm. to yield a clear, viscous, light amber drying oil.

*Example 4*

A p-tert-butyl phenol-formaldehyde resin was prepared from the following ingredients:

|  | G. |
|---|---|
| p-Tert-butyl phenol | 1200 |
| Formalin (37%) | 650 |
| Oxalic acid (anhyd.) | 8 |

The above materials were weighed into a one-gallon stainless steel autoclave. The autoclave was closed and the reactants were heated to and held at 155–158° C. for a total of 7 hours, after which the reaction mixture was cooled. The autoclave was then opened and the reaction mixture was found to contain a brittle light colored resin which had partially separated out of the aqueous reaction mixture. 200 g. of this resin, 150 cc. of xylene were placed in a 1-liter flask equipped with stirrer, thermometer, Stark and Dean tube with condenser. The xylene was added and the mixture heated to reflux temperature. In 2½ hours 28 cc. of water distilled over. The xylene was then removed under vacuum and the mixture heated to 250° C. under water pump vacuum. The product was poured over Dry Ice.

This resin was esterified in a reaction mixture containing the following compounds:

|  | G. |
|---|---|
| p-Tert-butyl phenol-formaldehyde resin | 50 |
| Mixed soybean oil fatty acids | 265 |
| Tri-(2-ethylhexyl) phosphite | 2 |
| Xylene | 40 |

The esterification procedure described in Example 1 was employed, the reaction mixture being held at a temperature of approximately 260° C. The extent of reaction at various time periods is indicated by the following table:

| Esterification time (hrs.) | 1 | 2 | 3 | 4 | 5 | 6 | 7 | 8 |
|---|---|---|---|---|---|---|---|---|
| Percent esterification | 56 | 71 | 79 | 84 | 88 | 90 | 92 | 93.5 |

A sample of the reaction mixture was stripped of volatile materials to yield a viscous drying oil having an acid number of 3.4, a hydroxyl number of 10, and a Gardner viscosity of 2592 seconds at 25° C.

*Example 5*

144.5 g. monochlororesorcinol, 200 g. lauric acid, 3 g. triphenyl phosphite and 50 cc. xylene were refluxed and agitated in an esterifier as described in Example 1 for four hours at 230–45° C. It was evaporated and stripped to 250° C. at 35μ. The residue was a dark liquid; it weighed 200 g. The product was analyzed for chlorine and found to contain 6.91%. The calculated chlorine content of the dilaurate is 6.96.

*Example 6*

203.5 g. hexachlorophene, 141 g. oleic acid, 2 g. triphenyl phosphite and 50 cc. xylene were heated and agitated under a Stark and Dean tube for three hours. The product was evaporated and stripped to a pot temperature of 275° C. at 250 μ. The residue was a dark liquid weighing 327 g., which was then analyzed for chlorine with the following results:

Percent chlorine
Found _____ 31.24
Calculated for hexachlorophene monooleate 31.74

*Example 7*

The following materials were charged into a 3-neck round bottom flask equipped with stirrer, Stark and Dean tube, and thermometer:

| Adipic acid | g | 73.0 |
|---|---|---|
| 2,2-(4,4′dihydroxy-diphenyl) propane | g | 114.0 |
| Triphenyl phosphite | g | 1.8 |
| Xylene | cc | 35 |

All of these materials were charged into the flask initially and the temperature was raised to 235° C. After about 16 hours, with the temperature maintained at 235–250° C., approximately 13 cc. of water (theory=18 cc.) were removed, indicating that a substantial degree of esterification had occured.

*Example 8*

A phenol-formaldehyde resin was prepared according to the procedure outlined in Example 1, from the following ingredients:

|  | G. |
|---|---|
| Phenol | 1807 |
| Formalin | 1001 |
| Oxalic acid | 4.8 |

After 7 hours of refluxing the reaction mixture was stripped to 310° C. at .4 mm. to yield 1247 g. of resin.

The above resin was esterified in the reaction mixture containing the following ingredients:

|  | G. |
|---|---|
| Phenolic resin | 100 |
| Mixed soybean oil fatty acids | 267 |
| Tri-para-cresyl phosphite | 2 |
| Xylene | 50 |

The esterification technique of Example 1 was employed and the temperature was maintained in the range of 233–240° C. The extent of esterification at the various time periods is indicated in the following table:

| Esterification time (hrs.) | 1 | 2 | 3 | 4½ | 5½ | 6½ | 7½ | 9½ |
|---|---|---|---|---|---|---|---|---|
| Percent esterification | 51.5 | 68 | 76 | 88 | 91 | 93.5 | 95 | 97 |

A sample of the reaction mixture was stripped to 275° C. at .1 mm. to yield a viscous drying oil.

Example 9

Di-(2-ethylhexyl)phosphite was prepared according to the procedure described by McCombie, Saunders, and Stacey (J. C. S. page 380 (1945)). 196 g. of 2-ethylhexanol (1½ mols) was dissolved in 200 cc. of carbon tetrachloride. The solution was placed in a 1-liter 3-neck flask equipped with stirrer, thermometer, and dropping funnel. 68.7 g. of phosphorous trichloride were dissolved in 30 cc. of carbon tetrachloride. This solution was added dropwise over a period of one hour to the hexanol solution in the flask. The reaction mixture stood for an additional hour after the addition of the phosphorous trichloride. The carbon tetrachloride and HCl were removed by heating to 140° C. under water pump vacuum. The remainder was distilled and a forerun of 44 g. was taken before the temperature reached 125° C. at .2 mm. The main fraction, composed principally of di-(2-ethylhexyl) phosphite, distilled from 125–130° C. at .2 mm. This faction weighed 84 g.; a residue of 21 g. remained. The main fraction had an $n_D^{30}$ 1.4397.

A phenol-formaldehyde resin was also prepared in the same manner as in other examples from formaldehyde and phenol in a mol ratio of 2⅜:4. The resin was esterfied with 267 g. of soybean oil acids in the presence of 50 cc. xylene and 2 g. of di-(2-ethylhexyl) phosphite. The esterification was carried out at 235° C. The results are as follows:

| Time | Percent Esterification |
|---|---|
| 1 hour | 55½ |
| 2 hours | 72½ |
| 3 hours | 81 |
| 4 hours | 86½ |
| 5 hours | 90 |
| 6 hours | 92½ |
| 7 hours | 94 |
| 7½ hours | 95 |

Example 10

182 g. of ortho-phenyl phenol-formaldehyde resin, 280 g. of soybean oil acids, and 3 g. of triphenyl phosphite were reacted in the presence of 40 cc. xylene. The procedure used was the same as described in other examples for this esterification. The results were as follows:

| Esterification Time | Percent Esterification | Esterification Temperature |
|---|---|---|
| | | Degrees Centigrade |
| 1 hour | 65 | 275 |
| 2 hours | 80 | 274 |
| 3 hours | 87 | 273 |
| 4 hours | 91 | 262 |
| 5 hours | 93 | 258 |

Example 11

100 g. p-tert-butyl phenol-formaldehyde resin, 173 g. of soybean oil fatty acids, 2 g. triphenyl phosphite, and 50 cc. xylene were heated to 260–264° C. The rate of esterification is indicated in the following table:

| Time | Percent Esterification |
|---|---|
| 1 hour | 62 |
| 2 hours | 80 |
| 3 hours | 85 |
| 4 hours | 89 |
| 5 hours | 93 |

I claim as my invention:

1. Process of esterifying a compound having a phenolic hydroxyl group with an organic carboxylic acid, which comprises heating a mixture of said compound and said acid to at least 150° C. but below the decomposition temperature in the presence of an ester of phosphorous acid, said ester being selected from the group consisting of aliphatic and aromatic esters.

2. Process of esterifying a compound having a phenolic hydroxyl group with an organic carboxylic acid, which comprises heating a mixture of said compound and said acid at a temperature in excess of 200° C. but below the decomposition temperature of the materials being reacted, in the presence of an ester of phosphorous acid, said ester being selected from the group consisting of aliphatic and aromatic esters.

3. Process of preparing higher fatty acid esters of phenol-formaldehyde resins, which comprises heating a mixture of said resin and a higher fatty acid to at least 150° C. but below the decomposition temperature in the presence of an ester of phosphorous acid, said ester being selected from the group consisting of aliphatic and aromatic esters.

4. Process of preparing higher fatty acid esters of phenol-formaldehyde resins, which comprises heating a mixture of said resin and a higher fatty acid at a temperature within the range of 200–300° C., in the presence of an ester of phosphorous acid, said ester being selected from the group consisting of aliphatic and aromatic esters.

5. Process of preparing a higher unsaturated fatty acid ester of phenol-formaldehyde resins, which comprises heating a mixture of said resin and a higher unsaturated fatty acid at a temperature within the range of 200–300° C., in the presence of an ester of phosphorous acid, said ester being selected from the group consisting of aliphatic and aromatic esters.

6. Process according to claim 5 in which the phenol-formaldehyde resin is derived from a substituted phenol.

7. Process of esterifying a compound containing a phenolic hydroxyl group with an organic carboxylic acid, which comprises heating a mixture of said compound and said acid to a temperature within the range of 200–300° C. in the presence of an aromatic ester of phosphorous acid.

8. Process according to claim 7 in which the organic acid is a monobasic acid.

9. Process according to claim 7 in which the organic acid is a polybasic acid.

10. Process according to claim 7 in which the phenolic compound is a polyhydric phenolic compound.

11. Process according to claim 7 in which the aromatic ester of phosphorous acid is triphenyl phosphite.

12. Process according to claim 7 in which the aromatic ester of phosphorous acid is tricresyl phosphite.

13. Process according to claim 7 in which the aromatic ester of phosphorous acid is tri-(2-ethylhexyl) phosphite.

14. Process according to claim 7 in which the aromatic ester of phosphorous acid is di-(2-ethylhexyl) phosphite.

15. Process of esterifying phenol-formaldehyde resins with the mixed fatty acids of a material selected from the group consisting of fats and oils, which comprises heating a mixture of said phenol-formaldehyde resin and said fatty acids to a temperature of at least 235° C. but below the decomposition temperature in the presence of triphenyl phosphite.

16. Process of esterifying phenol-formaldehyde resins with higher unsaturated fatty acids having at least semi-drying properties, which comprises heating a mixture of said phenol-formaldehyde resin and said unsaturated fatty acids to a temperature of at least 235° C. but below the decomposition temperature in the presence of triphenyl phosphite.

STUART A. HARRISON.

REFERENCES CITED

The following references are of record in the file of this patent:

UNITED STATES PATENTS

| Number | Name | Date |
|---|---|---|
| 2,351,958 | Habraschka | June 20, 1944 |

FOREIGN PATENTS

| Number | Country | Date |
|---|---|---|
| 588,833 | Great Britain | June 4, 1947 |